United States Patent
Kleider et al.

(10) Patent No.: US 6,301,265 B1
(45) Date of Patent: Oct. 9, 2001

(54) ADAPTIVE RATE SYSTEM AND METHOD FOR NETWORK COMMUNICATIONS

(75) Inventors: John Kleider, Scottsdale; Bruce Alan Fette, Mesa; William Michael Campbell, Phoenix; Cynthia Ann Jaskie, Scottsdale, all of AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/134,782

(22) Filed: Aug. 14, 1998

(51) Int. Cl.[7] .................................................. H04J 3/16
(52) U.S. Cl. ........................................................ 370/465
(58) Field of Search ................................ 370/465, 254, 370/252, 503, 501, 389, 480, 216, 474, 471, 476, 351, 352; 704/229, 233, 219, 226, 227, 228; 375/354, 355, 356, 285, 242, 243, 221, 244, 245, 246, 253, 254, 225

(56) References Cited

U.S. PATENT DOCUMENTS

| | | | |
|---|---|---|---|
| 4,701,923 | 10/1987 | Fukasawa et al. | 371/41 |
| 5,383,184 | 1/1995 | Champion | 370/62 |
| 5,978,762 | * 11/1999 | Smyth et al. | 704/229 |
| 6,163,766 | * 12/2000 | Kleides et al. | 704/229 |

FOREIGN PATENT DOCUMENTS

| | | | |
|---|---|---|---|
| 0713302 | 5/1996 | (EP) | H04L/1/00 |
| 9803030 | 1/1998 | (WO) | H04Q/7/38 |

OTHER PUBLICATIONS

An article entitled "A Robust Variable–Rate Speech Coder" by A. Shen, B. Tang, A. Alwan and G. Pottie, Department of Electrical Engineering, UCLA, from 1995 IEEE.

An article entitled "Multiresolution Broadcast For Digital HDTV Using Joint Source/Channel Coding" by K. Ramchandran, A. Ortega, K. Metin Uz, and Martin Vetterli, Sr. Member IEEE, from 1993 IEEE.

An article entitled "Multiresolution Joint Source–Channel Coding Using Embedded Constellations For Power–Constrained Time–Varying Channels." by Igor Kozintsev and Kannon Ramchandran from 1996 IEEE.

An article entitled "Variable Rate Speech And Channel Coding For Mobile Communication" by E. Yuen, P. Ho, and V. Cuperman, School of Engineering Science, Simon Fraser University from 1994 IEEE.

An article entitled "Combined Source And Channel Coding For Variable–Bit–Rate Speech Transmission" by D.J. Goodman and C.E. Sundberg from The Bell System Technical Journal, Sep. 1983.

\* cited by examiner

*Primary Examiner*—Dang Ton
(74) *Attorney, Agent, or Firm*—Gregory J. Gorrie; Maurice J. Jones; Sharon K. Coleman (57) ABSTRACT

A system and method for determining operating parameters to control a communication rate for an adaptive rate communication system includes a transmitter (101) to transmit a signal (135) through a network (142) to a receiver (103). The receiver (103) determines operating parameters based on, among other things, packet information from a received signal (e.g., packet). The receiver conveys the operating parameters to the transmitter for use in subsequent communications from the transmitter (101) to the receiver (103).

15 Claims, 4 Drawing Sheets

ADAPTIVE RATE SYSTEM AND METHOD FOR NETWORK COMMUNICATIONS

CROSS REFERENCE TO RELATED APPLICATIONS

This application is related to U.S. patent application Ser. No. 09/134,320, filed concurrently herewith, now U.S. Pat. No. 6,163,766, entitled "ADAPTIVE RATE SYSTEM AND METHOD FOR WIRELESS COMMUNICATIONS", U.S. patent application Ser. No. 09/050,504 filed Mar. 30, 1998, entitled "ADAPTIVE-RATE CODED DIGITAL IMAGE TRANSMISSION", now U.S. Pat. No. 6,154,489, and U.S. patent application Ser. No. 08/806,783 filed Feb. 26, 1997, entitled "METHOD AND APPARATUS FOR ADAPTIVE RATE COMMUNICATION SYSTEM", now U.S. Pat. No. 5,940,439, which are assigned to the same assignee as the present application.

FIELD OF THE INVENTION

This invention relates in general to communication systems, and more specifically, to adaptive rate communication systems.

BACKGROUND OF THE INVENTION

Modern wireless communications systems for speech communications are commonly implemented using a speech coder operating at a fixed bit rate, a channel coder operating at a fixed bit rate, and a modulator operating at a fixed modulation format. These systems ordinarily rely on specific, modestly changing channel conditions, however, in a typical system, channel conditions are continuously changing and may experience dramatic variation. A problem with such systems is a failure to allocate optimal bit rates and modulation strategies for controlling the system elements based on current channel conditions.

For example, when an analog channel for speech communications has very little noise, existing systems do not take advantage of channel conditions. Alternatively, when the same channel degrades because of the presence of noise, existing systems do not compensate for such degrading channel conditions.

Typical network communication systems also experience changing channel conditions. For example, Internet packets (e.g., a set of bits of a predetermined size) may be transmitted via Internet Protocol. Systems using Internet Protocol typically deliver a packet without error and fail to deliver a packet with errors. Packets may also be delivered "late". Additionally, an intelligent router conveys packets via different communications paths based on system congestion. Speech communications systems using a network are designed to operate under modestly changing channel conditions. However, since channel conditions may change dramatically, a problem with such systems is an inability to adjust operating parameters when packets are delayed, lost, or out of sequence.

Another problem with existing systems is that speech quality degrades because of lower bit rate speech coding. Current systems fail to provide a graceful degradation to lower bit rate speech coding when packets are delayed, lost, or out of sequence.

Thus, what is needed are a system and method to control bit rates for a transmitter and a receiver based on changing network conditions. What is also needed are a system and method for allocating bits based on a packet error rate in a network. What is also needed are a system and method to provide graceful degradation for a low rate speech coder when a packet error rate increases for a network. What is also needed are a system and method to provide a synthetic speech output when voice packets are delayed, lost, or out of sequence between a transmitter and a receiver.

BRIEF DESCRIPTION OF THE DRAWINGS

The invention is pointed out with particularity in the appended claims. However, a more complete understanding of the present invention may be derived by referring to the detailed description and claims when considered in connection with the FIGS, wherein like reference numbers refer to similar items throughout the figures and:

The exemplification set out herein illustrates a preferred embodiment of the invention in one form thereof, and such exemplification is not intended to be construed as limiting in any manner.

DETAILED DESCRIPTION OF THE PREFERRED EMBODIMENTS

The present invention provides, among other things, a system and method for controlling a communication rate for an adaptive rate communication system. In the preferred embodiments, the adaptive rate communication system conveys a signal from a transmitter to a receiver through a network (e.g. channel). The method includes determining operating parameters for the transmitter and the receiver based on information determined from packets conveyed from the transmitter to the receiver. The system transmits the operating parameters from the receiver to the transmitter for use in subsequent communications of the signal from the transmitter to the receiver.

The present invention also provides in the preferred embodiments, a system and method to control bit rates for a transmitter based on changing network conditions. The present invention also provides a system and method for allocating bits, for example parity bits, based on a packet error rate in a network. The present invention provides a system and method to provide graceful degradation for a low rate speech coder when a predetermined packet error rate is determined for a network. The present invention also provides a system and method to provide a synthetic speech output when voice packets are delayed, lost, or out of sequence between a transmitter and a receiver.

Figure 1:
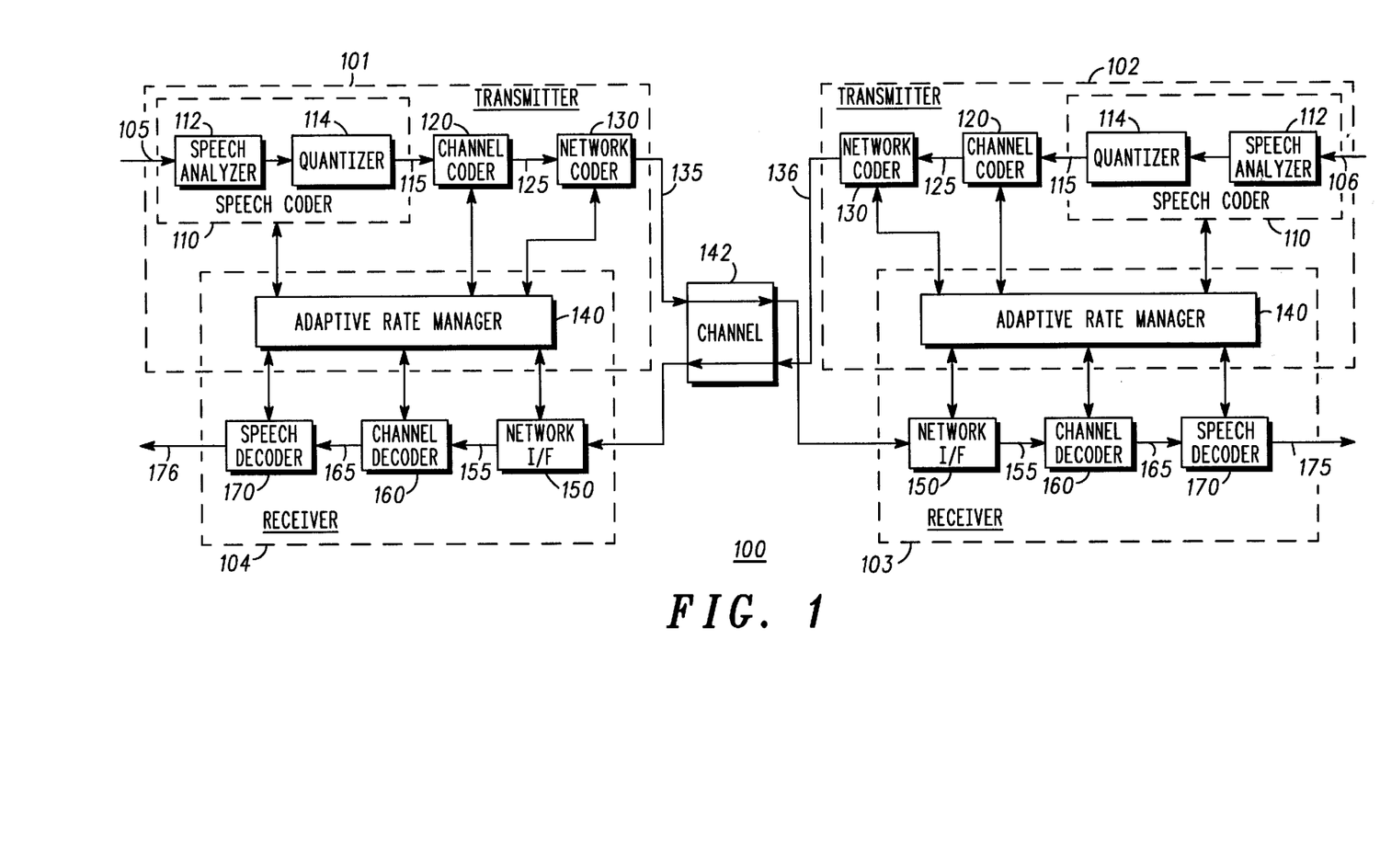
FIG. 1 shows a simplified block diagram for an adaptive rate communication system in accordance with a preferred embodiment of the present invention.

FIG. 1 shows a simplified block diagram for an adaptive rate communication system in accordance with a preferred embodiment of the present invention. In a preferred embodiment of the present invention, an adaptive rate communication system 100 includes transmitters 101–102 and receivers 103–104 coupled through channel 142. In a preferred embodiment, transmitters and receivers are referred to as terminals.

Preferably, elements for transmitters 101–102 and elements for receivers 103–104 are responsive to operating parameters determined by an adaptive rate manager 140 associated therewith. Operating parameters include speech coder bit rate, packet sequence information, and a parity indicator.

Transmitters 101–102 generally include speech coder 110, channel coder 120, network coder 130 and adaptive rate manager 140. Speech coder 110 preferably receives digitized speech signals 105–106 and generates quantized speech parameters signal 115. Quantized speech parameters signal 115 is subsequently received by channel coder 120. Channel coder 120 preferably adds parity information to quantized speech parameters signal 115 to produce protected speech signal 125 that is subsequently received by network coder 130. Network coder 130 preferably conveys packets of information to a network. Preferably, signal 135 is communicated from transmitter 101 to receiver 103, and signal 136 is communicated from transmitter 102 to receiver 104 as baseband signals in a packet format.

Speech signals 135–136 are conveyed to receivers 103–104, respectively, through channel 142. After speech signals 135–136 are conveyed through channel 142 to receivers 103–104, signals 135–136 are titled received signals.

Speech coder 110 primarily determines speech parameters based on speech signals 105–106 and the operating parameters. In a preferred embodiment, speech coder 110 is further comprised of speech analyzer 112 and quantizer 114.

Speech analyzer 112 receives operating parameters, for example, speech coder bit rate, to determine speech parameters (e.g., voicing, pitch, energy, line spectral frequencies, excitation) for each superframe determined from speech signals 105–106. In a preferred embodiment, a superframe is between 1 to 8 frames of digitized speech, each frame representing between, for example, 10 and 40 milliseconds (ms) of digitized speech, and the beginning of each frame separated by, for example, 10 to 30 ms.

Speech analyzer parameters may be organized for bit rates of, for example, 300, 450, 600, 1200, 1800, 2400, 4800, 9600, and 19200 bits per second (bps). Each bit rate preferably makes use of a superframe structure, for example, 4 to 8 frames per superframe. When lower bit rates are determined for speech analyzer 112, a superframe, with its attendant delays, is needed because of a coding gain obtained by taking advantage of the temporal redundancy in speech. Few bits per frame are available at, for example, 300, 450 and 600 bps to produce intelligible speech without a superframe structure. In a preferred embodiment, this constrains higher bit rates to have a delay similar to that for lower bit rates. So, a superframe structure at higher bit rates may be used to take advantage of a temporal redundancy in a superframe. Therefore, speech analyzer 112 preferably uses temporal vector quantizers for pitch, energy and spectral coding, since pitch, energy, and the spectrum change relatively slowly in time. Using this method, bits unused for speech analysis, even at higher bit rates, may be applied to, for example, excitation coding.

In a preferred embodiment, speech analyzer 112 may be organized as follows: pitch synchronous linear predictive coefficients (PSELP) for bit rates of 300 and 450 bps, PSELP with unvoiced excitation coding for 600 and 1200 bps, and residual excited PSELP (REPSELP) for 1800, 2400, 4800, 9600 and 19200 bps.

Preferably, for bit rates at and below 1200 bps, binary voicing, pitch, energy and the spectrum are characterized. For 600 and 1200 bps, an intermediate implementation adds additional bits to characterize the envelope of energy found in the residual excitation of unvoiced frames to improve the intelligibility of consonants. For 1800 bps and above, voicing, mixed voicing, pitch, energy, the spectrum and the residual excitation are characterized. Preferably, at 1800 and 2400 bps, one additional bit per frame is allocated to characterize mixed voicing that is generally used to indicate the presence of additional randomness in the excitation. Above 2400 bps, autocorrelation coefficients of a three tap pitch filter may be characterized with additional mixed voicing bits. A pitch filter further "whitens" a residual excitation so that it may be more efficiently quantized. Preferably, a residual excitation is characterized in a baseband of a frequency domain using vector quantization for segments of residual magnitudes. The frequency range of the segments and the definition of the baseband/highband boundary change for each of the bit rates.

In a preferred embodiment, for each bit rate to produce the same delay for speech coding, bit rates at 4 frames per superframe for quantizing purposes process 2 superframes in both transmitter and receiver to produce a delay that is longer than would otherwise be needed but similar to that for lower bit rates. For example, an algorithmic delay produced by 8 frames per superframe and 240 samples per frame may be 0.51 seconds.

Example speech analyzer parameters for a speech analyzer in accordance with the preferred embodiment of the present invention, and operating at a bit rate range of 300–19200 bps are, for example, frames per superframe (SF)=4 to 8, bits per SF=72 to 2304, samples per SF=240, binary voicing bits per SF=3 to 6, mixed voicing bits per SF=0 to 24, pitch gain bits per SF=5 to 7, pitch shape bits per SF=2 to 8, energy gain bits per SF=6, energy shape bits per SF=5 to 11, unvoiced segments per frame=1 to 3, unvoiced segment bits per SF=0 to 16, excitation bits per SF=0 to 2116, average excitation bits per frame 0 to 529, spectrum bits per SF=38 to 120, average spectrum bits per frame 4.75 to 30, spectral category bits per SF=4–8, and synchronization bits per SF 0 to 4.

In another embodiment, a more limited range of bit rates for a speech analyzer are, for example, 600, 1200, 1800, 2400, 4800, 9600, and 19200 bps, when the lower bit rates described above are unnecessary and the delay associated therewith is undesirable. When the largest superframe size is 4 frames as described for the sample the delay may be, for example, 0.27 seconds.

In another embodiment, an even more limited range of bit rates for a speech analyzer are, for example, 4800, 9600, and 19200 bps. A frame size may be specified as 180 samples instead of 240 samples and no superframe structure is needed because there are enough bits at these rates that the longer frame size and use of temporal redundancy in quantization are not needed. The delay for this embodiment may be, for example, 0.0675 seconds.

Quantizer 114 performs a quantization operation for the speech parameters and determines a sequence of bits to represent the speech parameters. Preferably, the speech parameters generated by speech analyzer 112 are quantized using a vector quantizer based on the speech coder bit rate for the spectrum, pitch, voicing, energy, and excitation function. Vector quantizers are preferably interpolated (spectral parameters from adjacent frames of speech), 16-bit delta quantizers (that characterize spectral change from a previous frame), and vector quantizers that operate on each set of speech parameters separately. Examples of these vectors quantizers may be, 5-bit, 7-bit, 9-bit, 8-bit, 10-bit, 16-bit, 18-bit, 20-bit, 24-bit, 26-bit, 30-bit, and 32-bit vector quantizers.

In a preferred embodiment, voicing and mixed voicing parameters are quantized using simple N-dimensional vector quantizers, where N is the number of frames per superframe. Preferably, pitch and energy parameters are quantized using gain/shape vector quantizers, wherein the average value in the N length vector of the parameter is used to normalize the vector before it is scalar quantized. Preferably, the average value or gain is then scalar quantized. N is preferably in the range of 1 to 8 as discussed above.

In a preferred embodiment, a spectral quantizer determines a list of potential spectral quantizer schemes for each frame in a superframe by taking advantage of adaptive coding on the rate distortion bound (ACRDB). In other words, potential quantizer schemes may be selected for each bit rate. For example, at 600 bps, a potential spectral quantizing scheme may be to quantize with 10, 20 or 30 bits per frame, or to interpolate over a frame. Preferably, the total number of bits allowed for quantizing each superframe is 40 bits. With this scheme, interpolation may be chosen for frames where a vocal track is changing slowly and smoothly. For example, an optimal combination of quantizers for a 4 frame superframe might be: interpolation, 20 bits, interpolation, 20 bits. In a preferred embodiment, this is one of 32 combinations that could be specified by the 5 bit spectral category parameter for a 600 bps speech coder.

In a preferred embodiment, a vector quantizer provides significant source data rate compression when encoding speech. Preferably, vector quantization is useful for compressing speech sounds, and to select vectors that represent the current sounds given a bit rate for a transmitter. In the preferred embodiment, vector quantization encodes combinations of parameters that appear in clusters where each parametric dimension has some correlation to another parametric dimension. For example, a first line spectral frequency (LSF) is highly correlated to a second LSF, and a ninth LSF is correlated to a tenth LSF. In this example, since the speech spectrum is dimensionally ten and many bits may be used to encode the LSFs, it is computationally convenient to perform a split VQ or a multistage VQ.

In a preferred embodiment, speech sounds "evolve" slowly versus time. Preferably, many speech parameters are highly correlated to a respective value in a previous frame or a future frame. Vector quantization across successive frames preferably captures this correlated and slow parametric evolution. In a preferred embodiment, vector quantizers take advantage of these encoding efficiencies. For example, the lower the data rate required, the more significant it is to take advantage of possible correlations. So, for low data rate speech coders, vector quantization preferably takes advantage of correlation in time and frequency. Time correlation is preferably implemented by difference or delta coding for changes since a previous frame. Alternatively, time correlation is implemented by encoding an interpolation technique that describes an intermediate frame as a first portion of an earlier frame, and a second portion of a future frame to achieve an acceptable encoding of the current frame. In a preferred embodiment, interpolation over a superframe is performed so that intermediate frames are interpolated.

Channel coder 120 performs error coding for the sequence of bits determined by quantizer 114. In a preferred embodiment, channel coder 120 adds packet sequence information and/or parity to a voice packet (e.g., encoded speech, packet sequence information, parity information).

Preferably, in this embodiment, channel coder 120 communicates directly to network coder 130. Network coder 130 represents an interface to a network, for example, a Local Area Network (LAN), Wide Area Network (WAN), Internet, etc. In another embodiment, adaptive rate manager 140 adds packet sequence information and/or parity to a voice packet. Preferably channel coder 120 generates a protected signal comprising the sequence of bits and parity information.

Network coder 130 transmits the protected signal, for example, signal 135, to a receiver through channel 142. In a preferred embodiment, network coder 130 conveys the protected signal (e.g., packet) and, when needed, operating parameters to the receiver. For example, when receiver 103 conveys new operating parameters to transmitter 101, adaptive rate manager 140 for transmitter 101 signals acceptance of the new operating parameters by attaching the new operating parameters to the protected signal and conveying the protected signal and the new operating parameters to receiver 103. Prior to conveying the new operating parameters to receiver 103, transmitter 101 elements are responsive to the new operating parameters. Again, for example, when receiver 103 requests a new speech coder bit rate, transmitter 101 conveys the new speech coder bit rate as part of signal 135 subsequent to speech coder 110 determining speech parameters at the new speech coder bit rate.

In a preferred embodiment, transmitter 102 performs operations similar to transmitter 101. Additionally, transmitter 102 communicates with receiver 104 in a manner similar to communications between transmitter 101 and receiver 103.

Receivers 103–104 preferably include network interface 150, channel decoder 160, speech decoder 170, 20 and adaptive rate manager 140. Preferably, network interface 150 receives signals 135–136 and generates signal 155. Signal 155 is similar to protected speech signal 125 with errors induced because of noise in channel 142. When no errors are induced because of noise in channel 142, signal 155 is preferably similar to protected speech signal 125. Channel decoder 160 receives signal 155 and performs error detection and correction on the signal based on parity information. Channel decoder 160 generates protected speech parameters that are processed by speech decoder 170 to produce synthesized speech at outputs 175–176.

Channel decoder 160 receives signal 155 via network interface 150. Channel decoder 160 may correct bit errors in signal 155 to produce error corrected signal 165. Preferably, channel decoder 160 determines parity for a packet determined from signal 155. Operating parameters for channel decoder 160 are predetermined during initialization or in accordance with operating parameters (e.g., parity indicator) received as part of signal 155. Channel decoder 160 performs parity operation on voice packets received by a receiver.

Speech decoder 170 receives error corrected signal 165 to synthesize speech. In a preferred embodiment, speech decoder 170 is responsive to an operating parameter that determines a speech decoder bit rate. Operating parameters for speech decoder 170 are predetermined during initialization or in accordance with operating parameters received as part of signals 135-136. In a preferred embodiment, speech decoder 170 synthesizes speech based on speech parameters determined from error corrected signal 165.

Adaptive rate manager 140 generally includes one or more processors and memories (not shown). In a preferred embodiment, adaptive rate manager 140 stores a software program in the memory, wherein the software program determines operating parameters for transmitters 101–102 and receivers 103–104. Preferably, one adaptive rate manager 140 is coupled to each transmitter and receiver pair, for example, one adaptive rate manager 140 is coupled to transmitter 101 and receiver 104, and one is coupled to transmitter 102 and receiver 103. In another embodiment, adaptive rate manager 140 is implemented in hardware logic.

In a preferred embodiment, the processor included in adaptive rate manager 140 for receivers 103–104 compares parity received in a packet with parity determined by channel decoder 160. Also, the processor for receiver 103 determines new (e.g., changed) operating parameters for receiver 103 and transmitter 101 based on, among other things, the packet error rate. The processor provides the new operating parameters as feedback to transmitter 101 through network coder 130 for transmitter 102. Transmitter 101 uses the operating parameters in subsequent communications of signal 135.

Preferably, the processor included in adaptive rate manager 140, for receiver 104, performs operations for receiver 104 and transmitter 102 that are similar to operations for receiver 103 and transmitter 101. Furthermore, the processor of adaptive rate manager 140 for receiver 104 performs operations for signal 136 for a reverse communication path.

Adaptive rate manager 140 includes a processor to compute a rate adjustment factor based on the packet information received at a receiver, and to determine the operating parameters for a transmitter based on the rate adjustment factor. Preferably, adaptive rate manager 140 provides the operating parameters to the transmitter for use in subsequent communications of voice packets from the transmitter to the receiver.

In a preferred embodiment, channel decoder 160 computes parity for a voice packet to determine a computed parity at the receiver. The processor of adaptive rate manager 140 compares the computed parity with another parity calculated at channel coder 120 at a transmitter, and adjusts the operating parameters when the computed parity and the second parity fail to compare.

Figure 2:
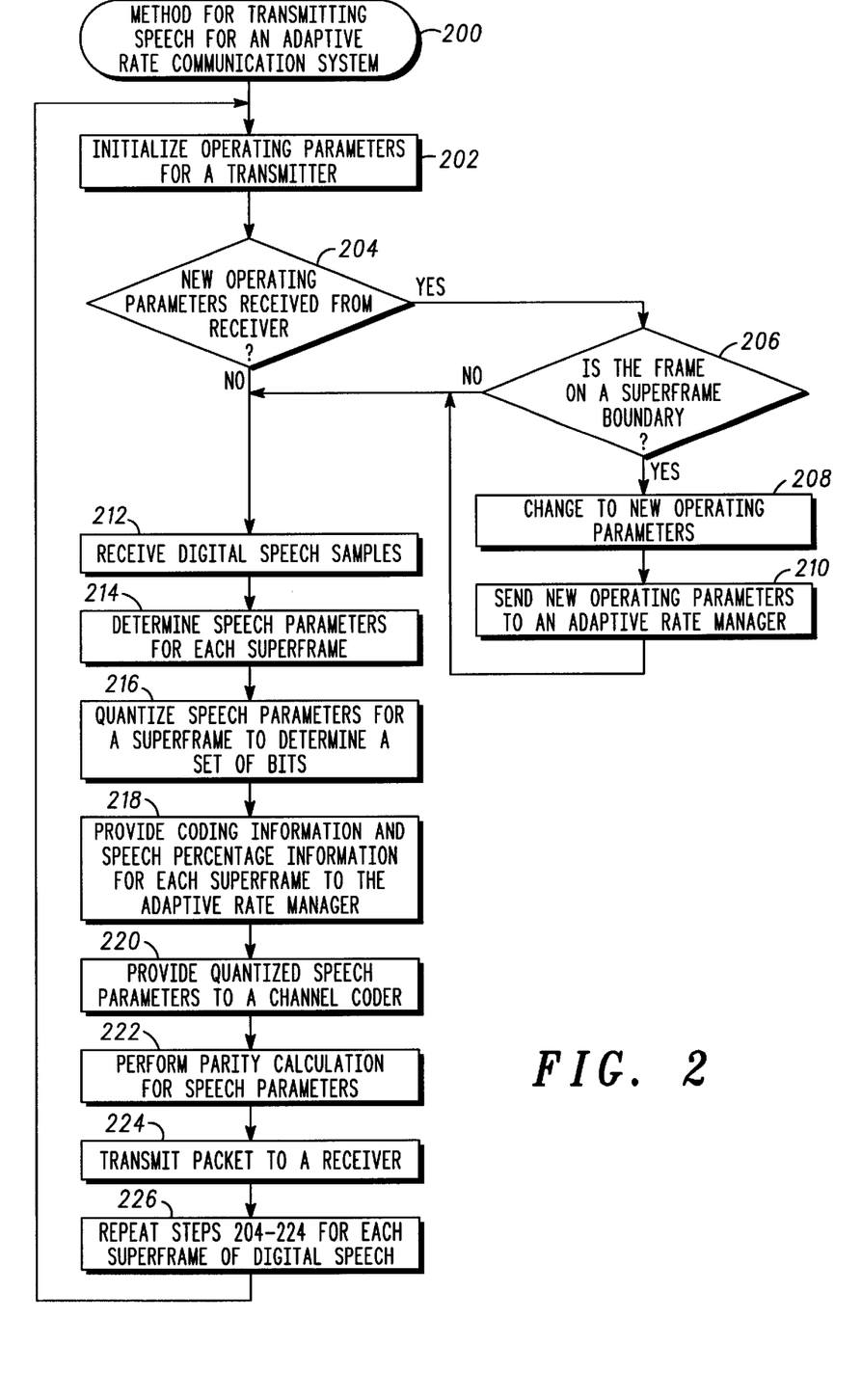
FIG. 2 shows a simplified flowchart for a procedure for transmitting speech for an adaptive rate communication system in accordance with a preferred embodiment of the present invention.

FIG. 2 shows a simplified flowchart for a procedure for transmitting speech for an adaptive rate communication system in accordance with a preferred embodiment of the present invention. In a preferred embodiment, procedure 200 is performed by a transmitter to transmit a signal to a receiver. Preferably, the transmitter and the receiver are responsive to operating parameters determined at the receiver. Transmitters 101–102 (FIG. 1) and receivers 103–104 (FIG. 1) are suitable for performing procedure 200.

In step 202, operating parameters for a transmitter are initialized. In a preferred embodiment, each element of the transmitter receives a set of operating parameters to perform initial operations. When an operating parameter, for example, a speech coder bit rate for a speech coder is at 1.8 kilobits per second (kbps), the speech analyzer parameters may be as follows: number of frames per superframe (SF)= 4, number of bits per SF=216, number of samples per SF=240, binary voicing bits per SF=4, mixed voicing bits per SF=4, pitch gain bits per SF=7, pitch shape bits per SF=8, energy gain bits per SF=6, energy shape bits per SF=11, unvoiced segments per frame=1, unvoiced segment bits per SF=0, excitation bits per SF=64, average excitation bits per frame=16, spectrum bits per SF=103, average spectrum bits per frame=26, spectral category bits per SF=4, and synchronization bits per SF=4.

In a preferred embodiment, an operating parameter for the quantizer may be, for example, a 16-bit delta quantizer to characterize the spectral change from the previous frame. An operating parameter for the channel coder may be, for example, an indicator bit to show when parity bits are included as part of a packet.

In step 204, a check is performed to determine when new operating parameters are received from the receiver. When new operating parameters are received at the transmitter, step 206 is performed. Otherwise, step 212 is performed.

In step 206, a check is performed to determine when a frame is on a superframe boundary. When a frame is on a superframe boundary, step 208 is performed. Otherwise, step 212 is performed.

In step 208, the current operating parameters are changed to the new operating parameters. In a preferred embodiment, when the receiver conveys new operating parameters to the transmitter, the adaptive rate manager for the transmitter conveys the new operating parameters to the elements for the transmitter. The operating parameters are conveyed, for example, to the speech coder and channel coder similar to that performed in step 202. Preferably, only new operating parameters that are different than current operating parameters are conveyed to the elements associated therewith.

As discussed above, operating parameters may be, for example, speech coder bit rate, packet sequencing information, and parity indicator.

In step 210, the new operating parameters are conveyed to the adaptive rate manager. In a preferred embodiment, the adaptive rate manager for the transmitter stores the new operating parameters and, in a subsequent step, conveys them to the network coder.

In step 212, digital speech samples are received. In a preferred embodiment, the speech analyzer receives digitized speech samples from a digitizing source. The speech analyzer organizes the speech samples into frames of digitized speech. Preferably, each frame represents, for example, between 10 and 40 milliseconds (ms) of digitized speech samples, and the beginning of each frame is separated by, for example, 10 to 30 ms.

In step 214, speech parameters for each superframe of speech are determined. In a preferred embodiment, the speech analyzer processes the speech samples as superframes of speech. As discussed above, a superframe is between 1 to 8 frames of digitized speech. Preferably, the speech analyzer receives operating parameters, for example, operating parameters discussed in steps 202–204, to determine speech parameters (e.g., voicing, pitch, energy, line spectral frequencies, excitation) for each superframe. Speech parameters are determined from a speech signal, for example, speech signal 105 (FIG. 1).

In step 216, speech parameters for a superframe are quantized to determine a set of bits. In a preferred embodiment, the speech parameters determined in step 214 are quantized using a vector quantizer. For example, for a speech coder bit rate of 1.8 kbps, a 16-bit delta quantizer that characterizes the spectral change from a previous frame of speech quantizes each frame within the superframe.

In step 218, coding information and a percentage of speech information in each superframe are provided to an adaptive rate manager. In a preferred embodiment, the speech coder bit rate and percentage of speech information determined by the speech analyzer are provided to the adaptive rate manager. When the speech coder bit rate and the percentage of speech information are different from previously transmitted values, the adaptive rate transmitter conveys the values as part of a signal, for example, signals 135–136 (FIG. 1).

In step 220, quantized speech parameters are provided to a channel coder. In a preferred embodiment, the speech coder provides a bit stream of quantized speech parameters to the channel coder.

In step 222, a parity calculation is performed for the speech parameters. In a preferred embodiment, packet sequencing information, a parity indicator, and parity are added to a voice packet.

In step 224, voice packets are conveyed to a network coder. In a preferred embodiment, the adaptive rate manager combines, among other things, the protected speech parameters and new operating parameters and conveys them to a network coder for transmission to a receiver via a packet.

In step 226, steps 204–224 are repeated for each superframe representing a speech signal. In a preferred embodiment, steps 204–224 are performed for each digitized speech signal received by the speech analyzer.

Figure 3:
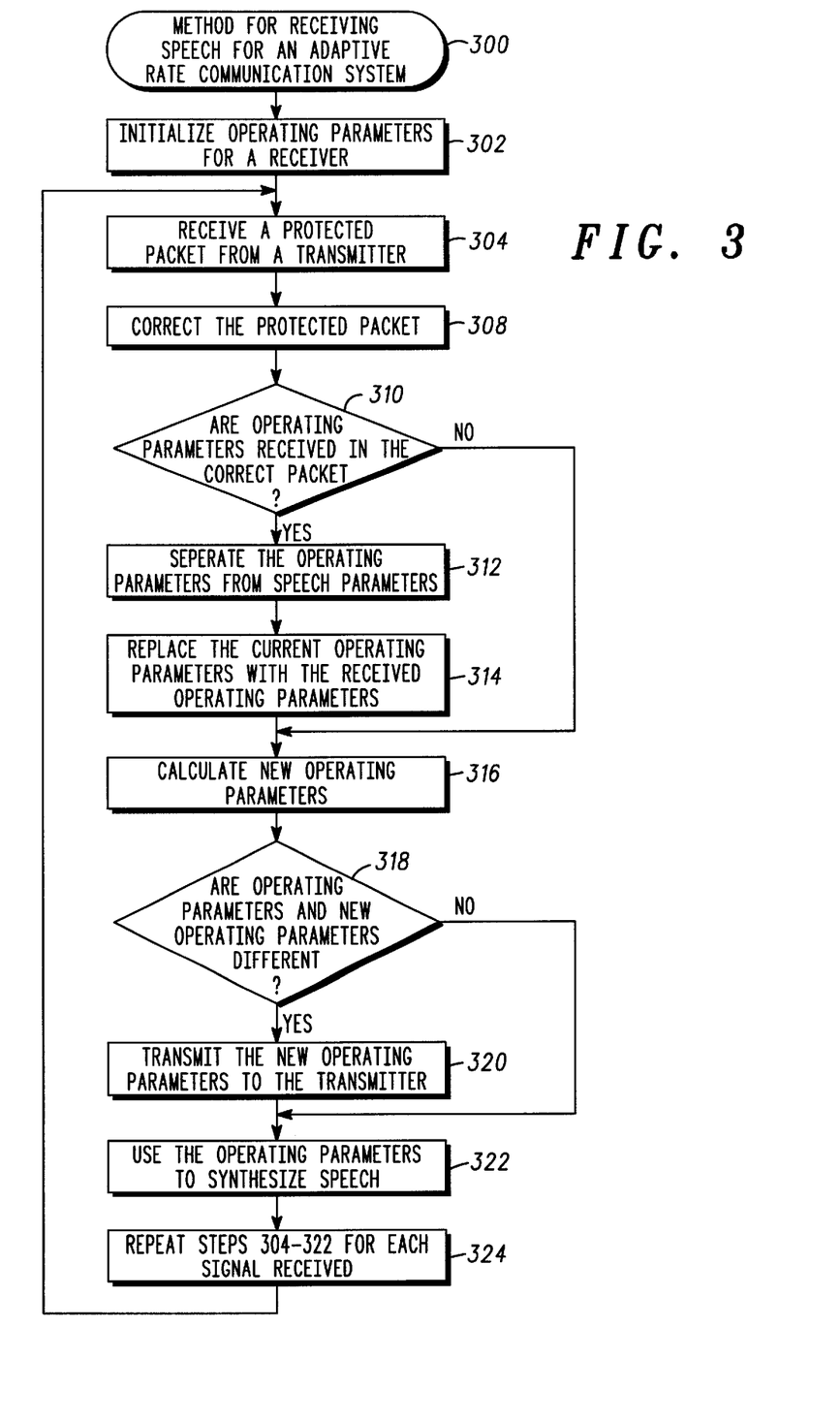
FIG. 3 shows a simplified flowchart for a procedure for receiving speech for an adaptive rate communication system in accordance with a preferred embodiment of the present invention.

FIG. 3 shows a simplified flowchart for a procedure for receiving speech for an adaptive rate communication system in accordance with a preferred embodiment of the present invention. In a preferred embodiment of the present invention, procedure 300 is performed by a receiver to receive a signal conveyed from a transmitter. Preferably, the transmitter and the receiver are each responsive to operating parameters determined at the receiver. Receivers 103–104 (FIG. 1) are suitable for performing procedure 300.

In step 302, operating parameters for a receiver are initialized. In a preferred embodiment, operating parameters are initialized for a receiver similar to that for operating parameters initialized for the transmitter, as discussed in step 202 (FIG. 2). For example, operating parameters for the speech decoder are initialized similar to operating parameters for the speech coder. Operating parameters for the channel decoder are initialized similar to operating parameters for the channel coder. Preferably, no operating parameters are initialized for the network interface.

In step 304, a protected packet is received from a transmitter. In a preferred embodiment, a network interface receives a packet from the transmitter to regenerate the protected packet. The protected packet is provided to the channel decoder.

In step 308, the protected packet is corrected. In a preferred embodiment, parity is calculated for the protected packet determined in step 304. The result is a set of speech parameters and, when received, new operating parameters.

In step 310, a check is performed to determine when operating parameters are received in the protected packet. In a preferred embodiment, when new operating parameters are transmitted from the transmitter to the receiver, the new operating parameters represent operating parameters previously conveyed from and determined by the receiver. The adaptive rate manager preferably evaluates a predetermined set of bits in the received signal to determine when new operating parameters are transmitted. When new operating parameters are transmitted, step 312 is performed. Otherwise, the received signal is primarily comprised of speech parameters, and step 316 is performed.

In step 312, the operating parameters are separated from speech parameters. In a preferred embodiment, the adaptive rate manager separates the operating parameters from the speech parameters.

In step 314, the current operating parameters are replaced with the received operating parameters. In a preferred embodiment, the adaptive rate manager replaces the current operating parameters with the new operating parameters received from the transmitter. Preferably, only those operating parameters that are different than the current operating parameters are replaced.

Step 316 calculates new operating parameters based on the packet information. When step 316 is complete, step 318 is performed.

In step 318, a check is performed to determine when the calculated operating parameters compare to the current operating parameters. In a preferred embodiment, the current operating parameters are compared to the operating parameters calculated in step 316. When a calculated operating parameter is different than a current operating parameter, step 320 is performed. Otherwise, step 322 is performed.

In step 320, the operating parameters are transmitted to the transmitter. In a preferred embodiment, the adaptive rate manager for the receiver provides, indirectly, operating parameters to the transmitter that conveyed a signal to the receiver. For example, when the receiver is receiver 103 (FIG. 1), adaptive rate manager 140 for receiver 103 provides operating parameters to transmitter 102. Transmitter 102 conveys the operating parameters to receiver 104. Adaptive rate manager 140 for receiver 104 then provides the operating parameters to the elements for transmitter 101 (e.g., speech coder 110, channel coder 120). Preferably, the operating parameters from receiver 103 to transmitter 101 are for use in subsequent communications of signal 135 from transmitter 101 to receiver 103.

In step 322, the operating parameters are used to synthesize the speech parameters. In a preferred embodiment, the speech decoder performs speech synthesis based on the speech parameters determined in steps 310–312. Preferably, the speech decoder is responsive to the operating parameters for the speech decoder. Operating parameters for the speech decoder are similar to operating parameters for the speech coder as discussed above, for example, step 202 (FIG. 2).

In step 324, steps 304–322 are repeated for each signal received. In a preferred embodiment, steps 304–322 are performed for each packet received by the receiver, for example, receiver 103 (FIG. 1).

In a preferred embodiment, operating parameters that differ from operating parameters determined previously are transmitted from a receiver to a transmitter.

Figure 4:
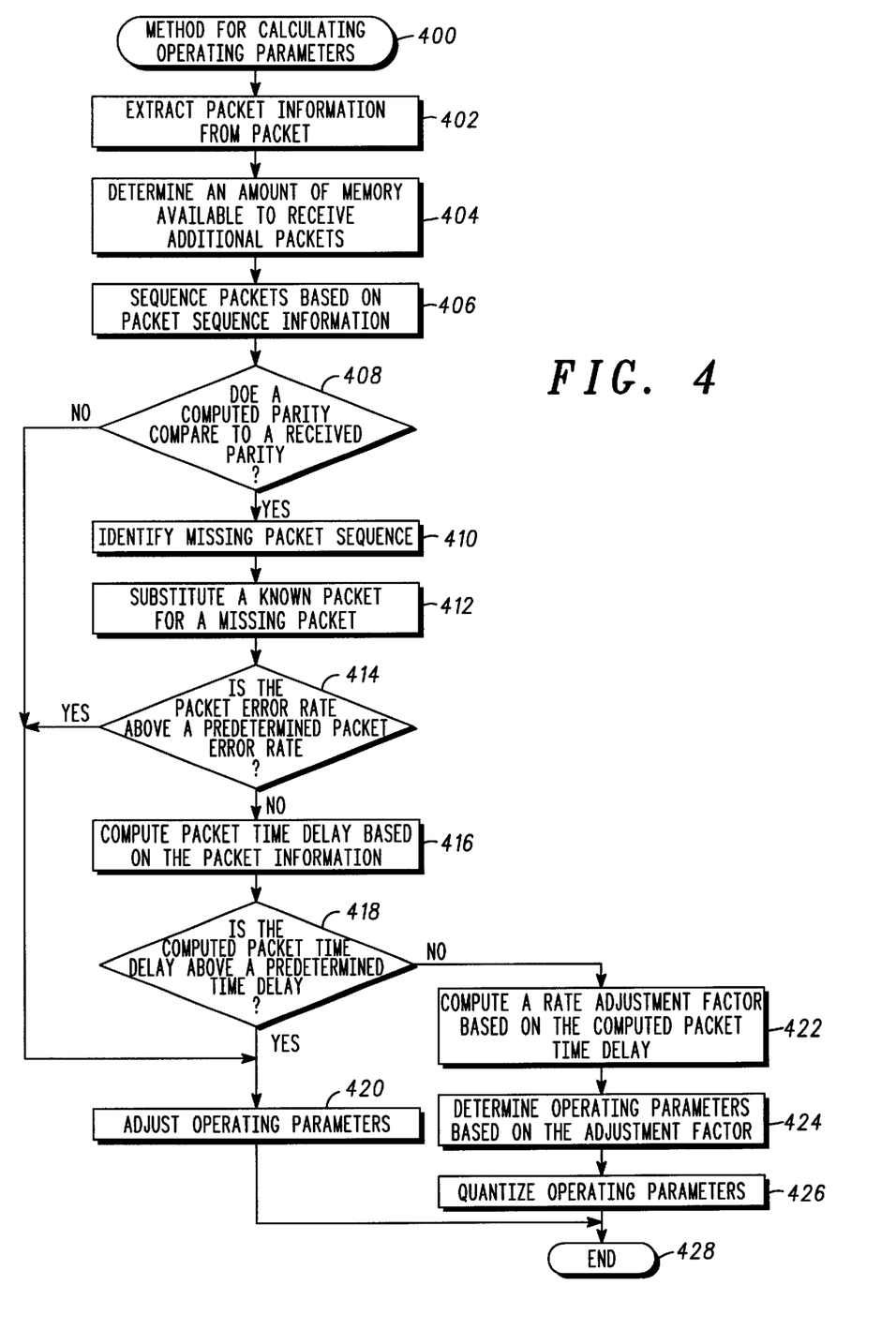
FIG. 4 shows a simplified flowchart for a procedure for calculating operating parameters for an adaptive rate communication system in accordance with a preferred embodiment of the present invention.

FIG. 4 shows a simplified flowchart for a procedure for calculating operating parameters for an adaptive rate communication system in accordance with a preferred embodiment of the present invention. In a preferred embodiment, procedure 400 is performed by a receiver (e.g., terminal) to calculate operating parameters for an adaptive rate communication system based on a packet conveyed from a transmitter (e.g., terminal) to the receiver. Preferably, the operating parameters effectively determine the communication rate for the adaptive rate communication system. Procedure 400 is suitable for performing step 316 of procedure 300.

In step 402, packet information is extracted from a packet. In a preferred embodiment, a voice packet is primarily comprised of packet information and speech parameters. Packet information preferably includes operating parameters (e.g., speech coder bit rate, packet sequence information, parity indicator), parity, network delay information, packet error rate information, and percentage of speech in the speech parameters. Preferably, network delay information and packet error rate information are determined by the network. Speech parameters are described above.

In step 404, an amount of memory available to receive additional packets is determined. In a preferred embodiment, the amount of memory available may be determined, for example, in eqn. 1, $$T_B = T_D - T_N,\qquad\text{(eqn. 1)}$$

wherein $T_B$ represents the available memory to receive packets (in packets), $T_D$ represents a maximum tolerable delay (in packets), and $T_N$ represents the network delay (in packets) determined from the packet information in step 402. Preferably, a receiving terminal determines when packets are accepted by that terminal based on $T_B$.

In step 406, packets are sequenced based on packet sequence information. In a preferred embodiment, since packets are received asynchronously and in arbitrary order, packet sequence information is used to determine an order for packets.

In step 408, a computed parity and a received parity are compared. In a preferred embodiment, parity is computed for a received packet to determine the computed parity. The received parity is received as part of the packet information. When the values fail to compare, step 420 is performed. Otherwise, step 410 is performed.

In step 410, a missing packet sequence is identified. In a preferred embodiment, the sequence of packets determined in step 406 is used to determine which packets failed to be received at a receiving terminal. Preferably, a packet is determined to be missing when the packet is not received within a predetermined time delay.

In step 412, a known packet is substituted for a missing packet. In a preferred embodiment, when a packet is determined to be a missing packet, a known packet is substituted for the received packet. Preferably, the known packet represents a speech model for silence, a low frequency buzz, or a previously received voice packet.

In step 414, a packet error rate is compared to a predetermined packet error rate. In a preferred embodiment, the packet error rate information determined in step 402 is compared to a predetermined packet error rate. Preferably, when the packet error rate is above the predetermined packet error rate, step 420 is performed. Otherwise, step 416 is performed.

In step 416, a packet time delay is computed based on packet information. In a preferred embodiment, the packet time delay, $P_{TIME\_DELAY}$, may be determined, for example, in eqn. 2, $$P_{TIME\_DELAY} = C_T T_N + C_P P_{ERROR\_RATE},\qquad\text{(eqn. 2)}$$

wherein $C_T$ represents a time delay mixing factor that is experimentally determined during system tuning, $T_N$ represents network delay information determined in step 402, $C_P$ represents a packet error rate mixing factor that is experimentally determined during system tuning, and $P_{ERROR\_RATE}$ represents the packet error rate determined in step 402. In preferred embodiment, $C_T$ and $C_P$ are each linearly or non-linearly variable as a function of $T_N$ and $P_{ERROR\_RATE}$, respectively.

In step 418, the computed packet time delay is compared to a predetermined time delay. In a preferred embodiment, $P_{TIME\_DELAY}$ is compared to the predetermined time delay. The predetermined time delay is preferably predetermined during system tuning. Preferably, when the packet time delay is above the predetermined time delay, step 420 is performed. Otherwise, step 422 is performed.

In step 420, operating parameters are adjusted. In a preferred embodiment, operating parameters are adjusted to perform at a low communication rate. In other words, step 420 adjusts the operating parameters to a low communication rate responsive to poor system performance (e.g., high packet error rate). When step 420 is complete, the procedure ends 428.

In step 422, a rate adjustment factor is computed. In a preferred embodiment, a rate adjustment factor, $R_{AF}$, may be computed, for example, by eqn. 3, $$R_{AF} = C_R P_{TIME\_DELAY},\qquad\text{(equ. 3)}$$

wherein $C_R$ represents a rate mixing factor that is experimentally determined during system tuning and $P_{TIME\_DELAY}$ is determined in step 418.

In step 424, operating parameters are determined. In a preferred embodiment, the operating parameters are determined based on the rate adjustment factor. An example calculation for a speech coding bit rate is shown in eqn. 4, $$OP_{NEW} = R_{AF} OP_{CURRENT},\qquad\text{(eqn. 4)}$$

wherein $OP_{NEW}$ represents the new operating parameter, $R_{AF}$ is described in step 422, and $OP_{CURRENT}$ represents the current operating parameter. For example, when $R_{AF}$ is 0.8 and the current speech coder bit rate is 9.6 kbps, the new speech coder bit rate is 7.68 kbps. Packet sequence information and the parity indicator are preferably unchanged based on eqn. 4.

In step 426, operating parameters are quantized. In a preferred embodiment, the new operating parameters determined in step 424 are quantized. For example, a speech coder may be designed to operate at discrete bit rates, therefore, a 7.68 kbps rate may be quantized to a bit rate of 4.8 kbps. In one embodiment, step 426 is optional. Procedure 400 ends 428.

Thus, what has been shown are a system and method to control bit rates for a transmitter and a receiver based on changing network conditions. What has also been shown are a system and method for allocating parity bits when a predetermined packet error rate is detected in a communication channel. Also shown are a system and method to provide graceful degradation for a low rate speech coder when a predetermined packet error rate is determined for a network. What has also been shown are a system and method to provide a synthetic speech output when voice packets are delayed, lost, or out of sequence between a transmitter and a receiver.

What is claimed is:

1. A method for controlling a communication rate for conveying voice packets from a first terminal to a second terminal through a network, the method comprising the steps of:

receiving the voice packets at the second terminal;

extracting packet information from the voice packets;

determining operating parameters for the first terminal based on the packet information;

transmitting the operating parameters from the second terminal to the first terminal for use in subsequent communications of the voice packets from the first terminal to the second terminal;

computing a first parity for each of the voice packets to determine a computed parity at the second terminal;

comparing the computed parity with a second parity calculated at the first terminal; and wherein the determining step further includes the step of adjusting the operating parameters when the computed parity and the second parity calculated at the first terminal fail to compare.

2. A method as claimed in claim 1, wherein the extracting step further includes the step of extracting network delay information from the packet information.

3. A method as claimed in claim 2, wherein the determining step includes the step of calculating the operating parameters based on the network delay information.

4. A method as claimed in claim 1, wherein the extracting step further includes the step of extracting packet error rate information from the packet information.

5. A method as claimed in claim 4, wherein the determining step includes the step of calculating the operating parameters based on the packet error rate information.

6. A method as claimed in claim 1, further comprising the steps of:

identifying a missing packet sequence; and substituting known packets for missing packets when the missing packet sequence is identified.

7. A method as claimed in claim 6, further comprising the step of synthesizing speech based on the voice packets and the known packets.

8. A method as claimed in claim 7, wherein the known packets represent speech models for silence.

9. A method as claimed in claim 7, wherein the known packets represent speech models for a low frequency buzz.

10. A method as claimed in claim 7, wherein the known packets represent previously received voice packets.

11. A method as claimed in claim 1, further comprising a step for computing a rate adjustment factor based on the packet information, and wherein in the determining step, the operating parameters are computed based on the rate adjustment factor.

12. A method as claimed in claim 1, wherein the determining step further includes a step of quantizing the operating parameters prior to the transmitting step.

13. An adaptive rate communication system comprising:

a first terminal to receive voice packets through a network, the first terminal to determine operating parameters to decode the voice packets based on packet information associated therewith; and a second terminal to convey the voice packets to the first terminal through the network, the second terminal being responsive to the operating parameters conveyed from the first terminal;

wherein the first terminal comprises an adaptive rate manager to determine the operating parameters, the adaptive rate manager comprising:

a processor to compute a rate adjustment factor based on the packet information received at the first terminal, and to determine the operating parameters for the second terminal based on the rate adjustment factor;

the first terminal further comprises means for providing the operating parameters to the second terminal for use in subsequent communications of the voice packets from the second terminal to the first terminal;

a channel decoder, the channel decoder including:

means for computing a first parity for the voice packet to determine a computed parity, at the first terminal;

wherein the adaptive rate manager further includes:

means for comparing the computed parity with a second parity calculated at the second terminal; and means for adjusting the operating parameters when the computed parity and the second parity fail to compare.

14. An adaptive rate communication system as claimed in claim 13, wherein the first terminal further comprises a speech decoder to synthesize speech using the voice packets.

15. An adaptive rate communication system as claimed in claim 13, wherein the second terminal comprises:

a speech coder to determine speech parameters based on a speech signal and the operating parameters;

a channel coder to create a protected signal using the speech parameters and the operating parameters; and an adaptive rate manager to convey the operating parameters to the speech coder and the channel coder.

\* \* \* \* \*